United States Patent [19]

Lomberk et al.

[11] 4,091,879
[45] May 30, 1978

[54] CONVERTIBLE GARDEN RAKE AND CULTIVATING TOOL

[76] Inventors: Edward Lomberk, 1207 Sugar Mill Row, New Port Richey, Fla. 33553; Edgar C. Rosston, 583 W. 215th St., New York, N.Y. 10034

[21] Appl. No.: 779,345

[22] Filed: Mar. 21, 1977

[51] Int. Cl.² .................................................. A01B 1/14
[52] U.S. Cl. ................................ 172/373; 56/400.01; 172/378; 172/430; 403/197; 403/200
[58] Field of Search ............... 172/197, 372, 373, 374, 172/378, 379, 430; 56/400.01, 400.15, 400.19, 400.2, 400.21; 403/27, 197, 200, 400; 85/61; 151/33, 41.7, 68; 116/124 A

[56] References Cited

U.S. PATENT DOCUMENTS

| | | | |
|---|---|---|---|
| 879,291 | 2/1908 | Meinen | 172/372 |
| 1,803,917 | 5/1931 | Powell | 172/197 |
| 2,802,503 | 8/1957 | Zupa | 151/41.7 |
| 3,022,099 | 2/1962 | Bruscaglioni | 403/27 |

FOREIGN PATENT DOCUMENTS 581,429  10/1946  United Kingdom ................. 403/400

*Primary Examiner*—Richard T. Stouffer
*Attorney, Agent, or Firm*—LaForest S. Saulsbury

[57] ABSTRACT

A hand garden tool generally in the form of a rake wherein all tines are individually vertically-adjustable upon the crossbar, some to different depths depending from the crossbar and alternate tines can be elevated or raised to allow the depending tines to astraddle vegetable plant or flower rows so the cultivating action is had by a single raking action or pass of the converted rake cultivating tool along the vegetable rows and so that the rows are cultivated on opposite sides at the same time. The vegetable or flower rows in the garden which are to be cultivated by the use of this tool can be spaced closer together and conserve upon ground space and the work required for the cultivator to keep a garden thereby greatly reduced. The tool can be inverted and worked from one side or the other with the alternate raised tines by less rows at a time and at times the pulling is being made in more tough ground. The tines are all made individually adjustable upon the crossbar but showing various structures to lock the individual tines in their adjusted positions. As the plant grows, the tines will be lowered to greater depths to adequately clear the tops of the plants that have grown even up to ten inches or more. The tines can take various forms and the locking structures of the tines can be varied for the different tine forms. One locking structure is made common to lock to all the adjusted tines onto the crossbar assembly in their individually-adjusted positions.

2 Claims, 16 Drawing Figures

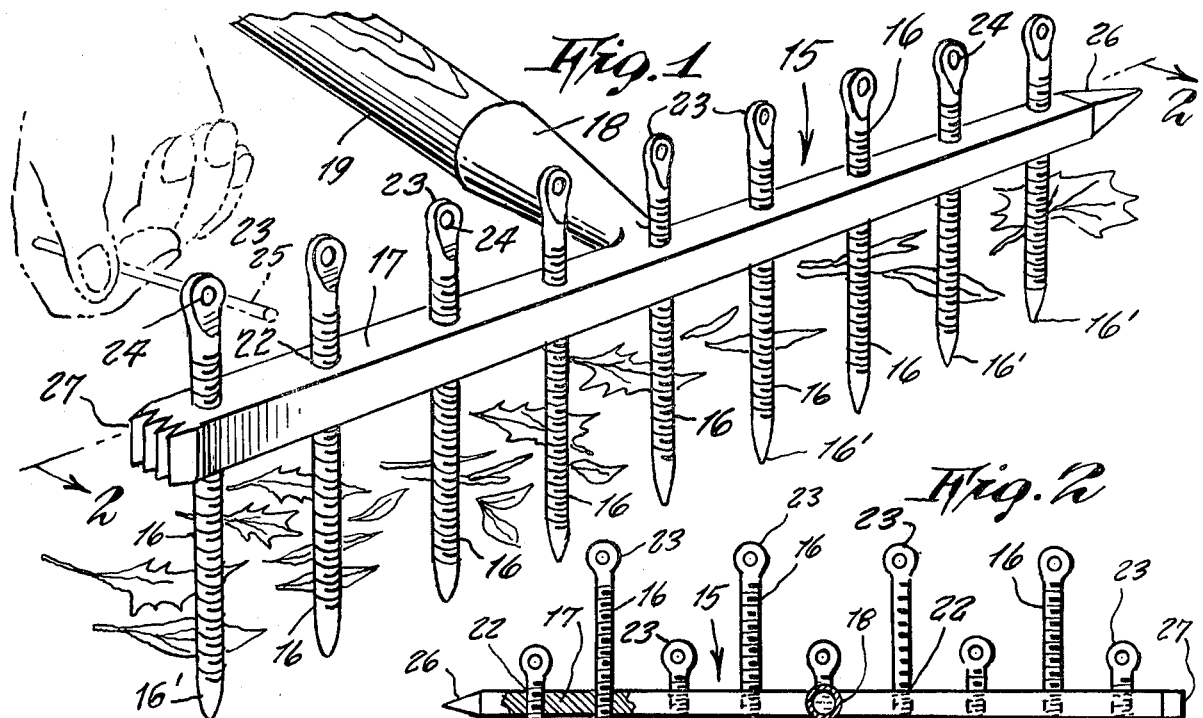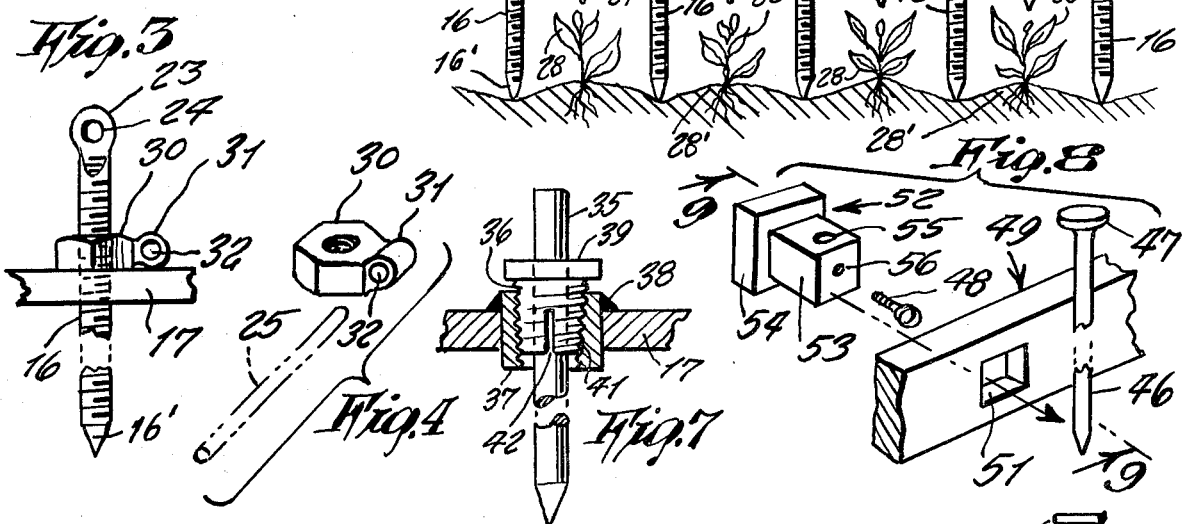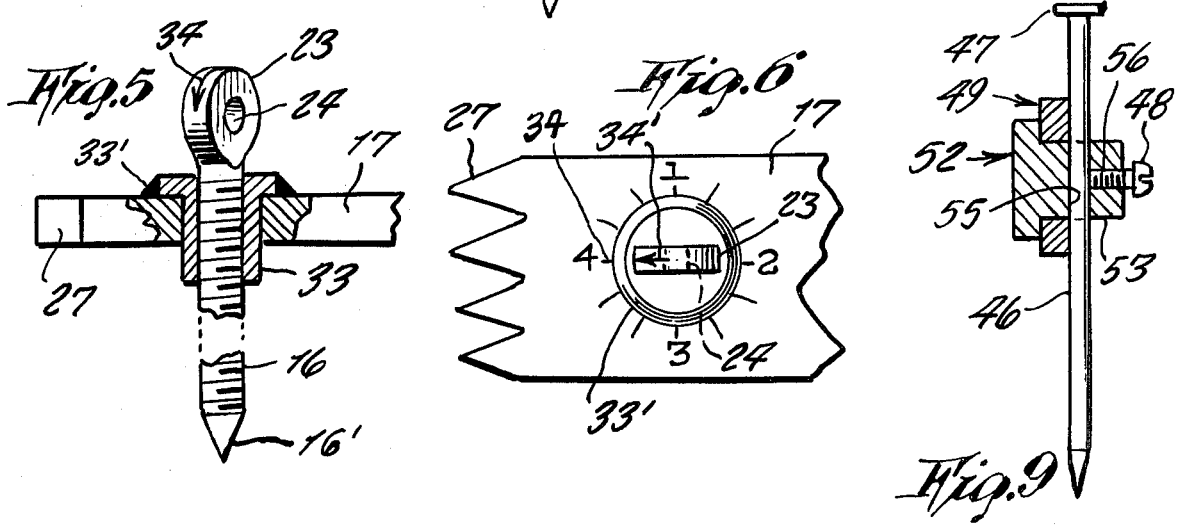

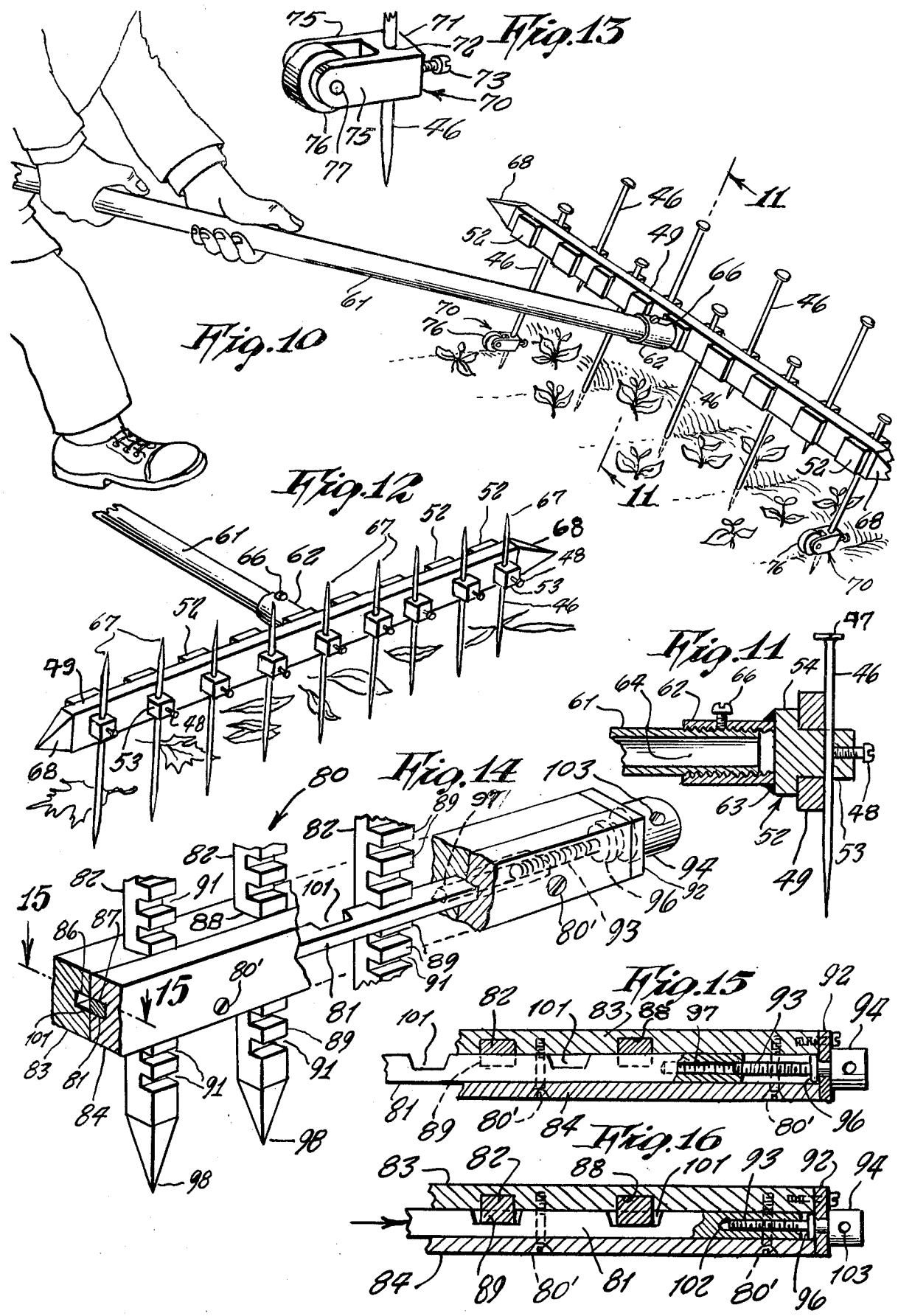

CONVERTIBLE GARDEN RAKE AND CULTIVATING TOOL

This invention relates to a convertible garden rake and cultivating tool for use by the small home gardener.

It is the principal object of the present invention to provide a garden tool that can be converted between a rake for raking leaves and weeds from the ground surface and a cultivating tool for cultivating garden vegetable or flower rows, which has tines that are individually adjustable from the usual length of three inches to some ten or more inches to render the rake adaptable to astraddle opposite sides of rows of growing vegetables so as to cultivate both sides at a time as well as between the rows to cultivate with one pass along the ground by the same raking action as when used for raking leaves whereby normally used time-consuming garden hoe used along but one side of a garden vegetable row at a time by chopping action will be done with a tool requiring a solitary pass and along multiple rows.

It is another object of this invention to provide a convertible garden rake and cultivating tool that is adaptable for use by the small gardener to put to further use the ordinary hand raking tool that is normally of little use in a garden and make it adaptable to cultivation of the garden as well as for the ordinary raking purposes about the gardener's premises.

It is another object of the invention to provide a convertible garden rake and cultivating tool, not only that can be converted from a rake, but which will permit closer planting of vegetable and flower rows, such as leaf lettuce radishes, carrots, parsley, etc., and do not require hilling and that cultivates more than one row at a time when placed astraddle of the rows and by mere pulling tool therealong.

It is still another object of the invention to provide a convertible garden rake and cultivating tool whose tines can be adjusted from a rake length of three inches to some ten or more inches in length to enable rake cultivation of string beans, corn, tomatoes, beets, etc., up to ten inches in growth with the adjustment being made as the plants grow and with almost unlimited adjustment to the cultivation for the season.

It is a further object of the invention to provide a convertible garden rake and cultivating tool in which the tines are individually adjusted from between normal rake positions of some three inches from the crossbar to substantially fully downwardly extended positions up to some ten inches while the alternate tines are substantially retracted out of and raised to use positions and can be taken from the tool completely to lighten its weight. It is a further object of the invention to provide a convertible garden rake and cultivating tool utilizing not only the threaded tines for effecting the direct and positive individual adjustment of the tine in the crossbar but also a tool with individually adjustable non-threaded tines that need not accumulate dirt to wear upon threads and which will be individually adjusted and individually locked in their adjusted positions or individually adjusted and locked by a device common to all tines.

It is a further object of the invention to provide a convertible garden rake and cultivating tool wherein the ends of the crossbar are for digging deep weeds and breaking up hard ground.

It is a still further object of the invention to provide a garden rake and cultivating tool in which the tines are adjustable through both the bottom and top of the crossbar wherein both ends of the tines are pointed so that the tool is adapted to cultivate four rows in reasonably soft dirt and can be flipped over and do three rows in less soft dirt with the alternate or raised tines and as well the tines can be adjusted for rake action so as to all be long on one side and when the tool is flipped over all be short on the other side.

Still further objects of the invention are to provide a convertible garden rake and cultivating tool having the above objects in mind, which is simple in construction, has a minimum number of parts, easy to assemble and adjust, will be given minimum wear, sturdy and rugged, easy to handle, light in weight, inexpensive to manufacture, the tine sized yet adjustable, efficient and effective in use.

For a better understanding of the invention reference may be had to the following detailed description, taken in connection with the accompanying drawing, in which, FIG. 1 is a perspective view of the convertible garden rake and cultivating tool with the individual tines evenly adjusted to form a rake with a hand illustration of how the tines are individually adjusted by rod and hand to the lowered or raised positions of FIG. 2.

FIG. 2 is a longitudinal rear view of the rake crossbar and tines taken generally on line 2—2 of FIG. 1 with tines lowered and alternate tines elevated to convert the rake of FIG. 1 into a cultivating tool and with lowered tines lying astraddle rows of vegetables to effect the cultivation on the opposite sides of the vegetable rows at the same time and therebetween by a single pass of the tool along the rows. FIG. 3 is an enlarged fragmentary elevational view of the tool showing lock nut on an individual tine tightened against the crossbar to hold the tine from rotation thereon as the tine is worked along the vegetable rows.

FIG. 4 is an enlarged collective and perspective view of the lock nut and rod used for tightening the nut upon the tine and against the crossbar.

FIG. 5 is a fragmentary vertical sectional view of the threaded tine adjustable in a depending internally-threaded sleeve, according to another modified form of the invention.

FIG. 6 is a fragmentary top plan view of adjustable tine of FIG. 5 showing a top adjusting scale on the crossbar to measure the amount of vertical adjustment of the tine.

FIG. 7 is a fragmentary longitudinal view of an adjustable tine rod according to still another modified form of the invention using a pointed rod with a threaded chuck means for locking the tine rod in its adjusted position to the crossbar.

FIG. 8 is a fragmentary exploded view of a spike tine according to still another modified form of the invention using spike tines such as ordinary nailing spikes with specially formed block elements for securing the spike in their adjusted position upon the crossbar in which all parts of the tool can be made from bar stock material.

FIG. 9 is an enlarged vertical sectional view of the form of the invention shown in FIG. 8 as generally viewed on line 9—9 but with the parts assembled and a spike tine locked flush sidewise against the crossbar in its adjusted position and by the block element and set screw.

FIG. 10 is an enlarged perspective assembled view of the completely converted cultivating tool formed of parts of FIGS. 8 and 9 with a handle attached to one of the block elements and illustration made as to the manner in which the tool is drawn through the vegetable or flower rows to cultivate opposite sides thereof and between rows at the same time and having depth gauge blocks on the lower ends of the end tines, the alternate spike tines being raised to out of the way positions.

FIG. 11 is an enlarged sectional view of the tool of FIG. 10 taken on line 11—11 of FIG. 10 and through the handle connection with one spike being shown that it is double pointed and which can advantageously be used in lieu of needed spikes of FIG. 10.

FIG. 12 is an enlarged perspective view similar to FIG. 10 but fragmentary, showing the double pointed tines adjusted evenly with the tool being adapted as a rake, the tines long on the underside of the crossbar and short on the upper side.

FIG. 13 is an enlarged perspective view of one of the wheel-supported depth gauges adjusted to the desired cultivating depth and fixed to the tine by a set screw.

FIG. 14 is an enlargement of a convertible tool constructed according to a further modified form of the invention wherein the crossbar is an assembly of two elongated opposingly slotted members for accomodating a longitudinally adjustable common locking device for a series of tines of rack formation, the tines being individually vertically adjustable in vertical slots in one of the elongated members with locking bar being longitudinally adjustable to extend into the rack teeth slots.

FIG. 15 is a fragmentary horizontal sectional view of the form of the invention shown in FIG. 14 taken on line 15—15 thereof and locking upon the adjusting bar screw.

FIG. 16 is a similar view thereof with tines released.

Referring now particularly to FIGS. 1 and 2, 15 represents a convertible garden rake and cultivating tool embodying the features of the present invention according to the principal form of the invention. This invention lies generally in a metal garden rake like construction, of about the same size thereof, but wherein its tines 16 are adjustable rather than integrally fixed and as best shown in FIG. 1 can be vertically adjusted to depend all at the same distance from the lower face of a crossbar 17 or alternately with some tines down and some tines up to provide a cultivating tool to astraddle vegetable rows. Midway the ends of the crossbar is a rearwardly-extending internally-tapered sleeve shank 18 integrally formed on the crossbar and into which a wood or metal handle 19 is tightly secured. Thus, as shown in FIG. 1 with all the tines adjusted to even depth, the tool can be used as a garden rake with integral tine is used for raking grass, leaves and weeds. According to the present invention, the tines 16 are extra long threaded screws pointed at their lower ends at 16' to dig and cultivate the dirt and adapted for use in a garden as best illustrated in FIG. 2. These tines 16 are threaded through vertical holes 22 in the crossbar 17 and extend thereabove with their round heads 23 with cross tool holes 24 in them through which as illustrated in FIG. 1 one can extend by hand a small rod tool 25 and by turning adjust individual threaded tine to extend further down through the crossbar threaded hole 22 and an alternate threaded tine to extend further upwardly from through the crossbar so that its pointed end will no longer engage the ground to be used in the cultivating operation and will thereby provide space between the deep adjusted tines 16 spaced to accommodate a growing vegetable or flower plants 28 there between without interference from the lifted alternate tines 16. With one pass of the rake along row of the growing plants 28, the lowered tines will not only cultivate and loosen the ground between the rows but on the opposite sides of the plant at the same time. With the fewer tines lowered for the cultivating action, the ground will be penetrated to effect the loosening of the relatively soft garden surface and will remove the weeds and the rake will have been thus converted into a cultivating tool from all of the tines lowered as in FIG. 1 as little penetration could have been possible even in more soft garden soil. A rake has thus been converted into a cultivating tool. The tines 16 which are lowered can be varied in depth from 3 inches to some 8 inches depending upon the stage of growth or height of the growing plants to be cultivated. If the tines are 12 inches long, string beans rows could be cultivated up to 10 inches in growth. The same applies to corn, tomatoes, beets, and so on. By use of this tool, the spacing of the plant rows can be made closer together than if the rows were to be cultivated with a bladed hoe where space is needed for chopping action rather than of a solitary pass as done with present tool. The tines have somewhat unlimited adjustment and can be lowered to the different heights of the plant as it grows.

The crossbar 17 may be pointed on one end at 26 to break up hard ground, loosen rocks and deep-rooted weeds. Both ends of the crossbar can be pointed in this manner or the opposite ends of the crossbar 17 can be saw-toothed as at 27 and similarly used to break up the ground lumps. The handle will be turned in the hand to present the ends of the crossbar to these digging operations. The dirt with one pass of the tool will ordinarily be broken and cultivation effected between plant rows 28 as seen in FIG. 2.

In order to keep down the weight of the tool, the crossbar 17 and handle sleeve 18, instead of being formed of cast iron, could be cast of aluminum of sufficient hardness and thickness to hold the threaded tines 22 in their holes against deflection as well as against turning movement as the tool is being dragged through the ground surface and as rigid as if the tines were cast integrally with the crossbar as with the ordinary metal garden rake.

Modifications accordingly have been made to lock threaded tines against turning and provide non-threaded tines vertically-adjustable and means for locking them in their raised or lowered positions. In one instance, a common locking means has been provided for locking all of the several tines of the tool, after they have been individually adjusted. Concern has also been given to the wear of the tine threads as the tool is dragged through the dirt and to keep the dirt from entering to any extent the threaded holes in the crossbar during the adjusting operations to wear their threads, rust or freeze the threaded tines against adjustment in these crossbar holes. The crossbar and tine may be coated with "Teflon" or like wear and rust resisting compounds when they are made of iron or steel. The crossbar can of course be thickened to give adequate thread depth or a drop sleeve can be depended from the underside of the crossbar.

In FIGS. 3 and 4, there is shown a lock nut 30 that is threaded to the upper end of the threaded tine 16 and turnable against the top surface of the crossbar 17 to positively lock the threaded tine to crossbar 17 against turning in the crossbar as the tool is used and reduce wear in the threaded crossbar holes 22. The lock nut is of hexagonal shape and is rigidly provided on one of its side faces with a cross sleeve 31 having a central hole 32, into which the above mentioned tine adjusting rod 25 may be inserted to tighten down the lock nut or lifted to permit other adjustment of the threaded tine 16. Thus, the threaded tine 16 is kept from turning and its depth adjustment maintained along with the other adjusted threaded tines and so that all of the lowered tines will cultivate at the same depths.

To reduce the weight of the cultivating tool, the alternate tines can be completely removed from the crossbar. The upward adjustment or the removal of the tines can vary according to the nature of the cultivating operation to be effected and the spacing of the plant rows, but there should be sufficient weight on the depending tines to weight the tool by itself while making the cultivating pass of the tool through the plant rows without encountering stoppage of movement of the tool through the plant rows.

In FIGS. 5 and 6, there has been provided an internally-threaded flanged sleeve 33 having its flange welded at 33' to the face of the crossbar 17 whereby the deep thread will be provided on the crossbar 17 for the adjustment of the threaded pointed tine 16 whereby to give the tine 16 a firm hold and with less tendency for it to turn from its adjusted position when the tool is being used. In order that the amount of adjustment can be determined and maintained the top of the crossbar has circumferential scale indicia 34 around the weld of the sleeve flange to the top of the crossbar 17 and is used with reference from an arrow 34' on the top of the rounded head 23 of the threaded tine 16.

In FIG. 7, an unthreaded tine or pointed rod 35 is used and held in its adjusted position by a tapered chuck sleeve 36 that is threaded into an elongated internally-threaded sleeve 37. This sleeve 37 extends down through free opening in the crossbar 17 and welded at 38 at its upper end about the top face of the crossbar 17. The chuck sleeve 36 has a head 39 adapted to receive a tool by which the chuck sleeve can be threaded down into the fixed internally-threaded sleeve 37 to bring together lower end portions 41 of the chuck sleeve separated by slits 42 to tightly grip the rod 35 in its adjusted position. With the rod there are no threads to wear or tend to turn the rod so as to alter its depth adjustment. All of the rods of the crossbar 17 can be readily adjusted to the same positions as the threaded tines of FIG. 2 to provide the cultivating tool that can cultivate at the same time multiple rows of growing vegetables.

In FIGS. 8 to 13, there is shown a modification where the tines are in the form of an ordinary nailing spike 46 having their driving heads 47 and the spikes secured in adjusted positions on the crossbar 17 by means not including extensive threading beyond that of an ordinary set screw 48. The nailing spikes 46 and the set screws 48 can both be purchased at any hardware store. Instead of the crossbar having wide top and bottom surfaces, a crossbar 49 for stock metal strap is turned with small edge up. The crossbar 49 is provided with a series of smooth square holes 51, equally spaced from one another across the crossbar 49 like the threaded holes 22 are spaced across the crossbar 17 of FIGS. 1 and 2. These holes extend between and through wide front rear face to accomodate clamping blocks 52, each of which having a square section shank 53 and an enlarged square head 54 that when the block is brought tight through the square hole 51 as seen in FIG. 9 the spike will lie held flush against the rear face of the crossbar 49. The shank 53 has a vertical hole 55 measured the exact thickness of the crossbar with no tolerance from the sqare head 54 to accommodate and hold the spike 46 tightly and flush frictionally against the rear face of the crossbar 49.

The spikes 46 thus hold the blocks 52 in place against axial displacement from holes 51 in the crossbar 49 and are held in place against lateral twist by the square shank 53 of the block 52 and engaging the flat opposing faces of the square opening 51. The spike is thus so held against lateral twist and in its vertically-adjusted position to be certain, a set screw 48 is used that enters a threaded end hole 56 in shank 53 and engaging the rear side of the spike 46.

To lighten the weight of the tool when adapted for use in cultivation of the opposite sides of the plant rows, the alternate spikes 46 instead of just being lifted can be withdrawn and their blocks 52 can be removed from the crossbar 49 while leaving only the cultivating spikes and their blocks locked in place on the crossbar 49. Of course, the alternate threaded tines of the forms of the invention shown in FIGS. 1 to 3 can be threadedly removed if desired, but it may be that with more clay soil the added weight would be needed for the operation of the tool, since the cultivating tool is worked under its own weight with more or less a single pass down the greater length of the plant row or perhaps its entire length without having to unload the tool of gathered weeds.

In FIGS. 10 and 11, there is shown the spike holding block 52 at the midway the ends of the crossbar 49 that has been adapted to receive a wood or metal handle 61. The head 54 of the block 52 has an internally-threaded sleeve 62 welded to it by a peripheral weld 63 to provide a rigid handle socket adapted to threadedly receive a threaded end 64 of the handle 61. A set screw 66 is threaded into the sleeve 62 for engagement with the threaded portion 64 of the handle 61 to hold the handle against being turned out of the sleeve 62 except when the parts of the tool are to be shipped disassembled or a broken handle to be replaced with another one. This block 52 having the handle holding sleeve would never be removed from the crossbar 49 as for transverse balance of the crossbar 49 the middle spike 46 would always remain on the rake being converted to a cultivating tool. The alternate spikes 46 of FIG. 10 are shown not only raised but extended through their block holes 55 upside down so if the dirt is too much for the pulling of five times to do four vegetable rows, the tool can be turned over to use but the four alternate tines and do but three vegetable rows at a time. The spikes 46 when all centered in their holes 55 through the blocks 52 with their pointed ends evenly down, the tool may serve as a rake.

If the spikes have their heads 47 cut off and their shanks pointed as indicated at 67 in FIG. 11 and to provide in effect double-pointed rods, there would be no need to reverse the alternate spikes of FIGS. 8, 9 and 10 to convert the rake into either a four vegetable row or a three vegetable row cultivator. As a matter of fact when all the double pointed spikes 46 of FIG. 11 as seen in the rake of FIG. 12 and adjusted to their rake length positions, centered to extend even distances you will have in effect a double side rake.

If desired, the adjustment of the rake rods can depend at different distances above and below the edges of the crossbar 49 so that you have in effect two rakes in the same tool, one for deep raking and the other for less deep raking. This is best illustrated in the fragmented view of FIG. 12 where the adjustment of all the spikes 46 of the rake have been left longer below crossbar 46 than above the crossbar 49, and it is simply necessary to turn over the rake to use either the short or long tines.

The ends of the crossbar 49 can be made pointed or sawtoothed as seen at 68 in FIGS. 10 and 12 for digging up rocks or deep rooted weeds. It should be apparent that while the form of the tool shown in FIGS. 8 to 13 are not as simple as shown in the form of the invention shown in FIGS. 1 to 3 but has several advantages above-mentioned as not only of providing a two-sided cultivating tool or rake but that this tool of FIGS. 8 to 12 can be fabricated from stock strap or rod material and the nail spikes as when lost can be easily purchased at a hardware store and replaced.

As seen in FIGS. 10 to 13, a ground wheel support attachment 70 can be placed on certain tines 46 to gauge the depth of cultivation of the tool. This attachment 70 has an attaching block 71 with a hole 72 for receiving spike 46 and a set screw 73 in the block 71 when tightened upon the spike 46 will hold the attachment in the adjusted position upon the spike 46.

The block 70 has spaced opposing extensions 74 and 75 on a support wheel 76 whereby cross pin 71 and as seen in FIG. 10 will lie ahead of the spike 46. Two such wheel attachments should be put on the tool.

In each of the forms of the invention thus far shown, with individual locking means for the respective tines, it has been necessary to separately lock the tine in its adjusted position thereby taking more time to convert the rake to a cultivating tool, or the cultivating tool to a rake where the pointed ends of the tines have to be transversely aligned during the adjusting operation thereby requiring the unscrewing and screwing of each locking device. Accordingly, there has been made, as will be seen with the next further form of the invention, to provide a common locking device that will lock in place all of the adjusted tines at the same time.

In FIGS. 14, 15 and 16, there is shown a fragment of a convertible tool and of its crossbar assembly 80 with such a common locking bar device 81 and wherein there is used with this tool, tines 82 of rack bar shape rather than the threaded ones 16 of the form of the invention of FIGS. 1 to 3. The rack bar tines present a smooth front digging face, and lie in square slots so that they cannot be turned, or, as with threads, get filled with dirt to give wear thereto or interfere therewith upon being adjusted.

The crossbar assembly 80 includes two opposingly, internally-slotted elongated front and rear bar members 83 and 84 respectively having opposing slots 86 and 87 and the locking bar device 81 that is slidably retained in the joined bar members and their slots 88.

In the inner face of the front bar member 83 is a series of vertically-extending longitudinally-spaced slots 88 respectively adapted to fully accommodate the rack bar tines 82 for vertical adjustment downwardly or upwardly of the bottom face of the crossbar assembly 80. Alternate tines are raised while the other ones are lowered whereby to convert the rake tool into a cultivating tool. Each rack bar tine while smooth on its front face has a series of equally-spaced rack teeth 89 along its rear face and spaces 91 lying between the rack teeth are such as to slidably receive one edge of the common locking bar 81 that is slidably-retained between the opposing bar members and with their opposing slots 86 and 87. The ends of the crossbar members 83 and 84 are held together at the side ends to contain the locking bar 81 and the tines 82, by welding or fastening screws on end plates 92, only one being shown, in one of which is freely journaled an end adjusting screw 93, FIG. 15, having an enlarged hand knob 94 and an enlargement 96 on the screw to keep the screw from being backed out of the end plate 92 and so that turning the screw 93 that enters threaded opening 97 in the locking bar 81 is adjusted longitudinally in the joined slots 86 and 87 of the bar members 83 and 84. The rack tines 82 will be pointed respectively on both ends as indicated at 98 and the rack teeth 89 will extend substantially through the full height of the tine and except for the pointed ends.

The locking bar 81 has cutaway notches or slots 101 in its forward edge spaced to receive the rack teeth 89 of the tines 82 when the bar 81 is moved to right as viewed in FIG. 16 by turning the screw 93 by its knob 94 so that the bar 81 having threaded hole 97 is closed upon the screw 93. In this position, all of the rack tines 82 will have become vertically-aligned with the notches 101 so that they can be easily hand-adjusted to their desired depth positions and the alternate tines elevated to their raised positions so as to permit the vegetable rows to pass under them. After all the tines have been set through vertical square slot of forward crossbar 83 the vertical notches or slots 101 of the locking bar 81 the screw 93 can be turned by its knob 94 to turn the screw out of threads 97 of the bar 81 and move the bar to the left, FIG. 15, and the notches 101 of bar 81 taken out of vertical alignment with rack teeth 82 and the bar edge itself pulled into the spaces 91 between rack teeth 89 so as to support and positively lock the rack tines 82 in their vertically-adjusted positions. Since the tines 82 are pointed on both ends and adjusted to the positions of FIG. 10, the tool instead of upon four rows as illustrated can be inverted to use upon three vegetable rows. The rack tines 82 are thus without threads and their rack teeth are in rear so there is little chance of wear upon the tines or their teeth that would interfere with their adjustment from time to time as might be had with dirtied threaded screw tines of FIGS. 1 to 3. The notches 101 of the locking bar 81 are relieved at their ends to prevent dirt which may have collected in the tine teeth slots 91 from holding up the sliding adjustment of the notched bar 81. A hole 103 is provided in the large knob 94 of the lateral-bar adjusting screw 93 to receive a rod tool much as illustrated in FIGS. 1 and 4 to facilitate the turning of the threaded screw 93 when setting and locking of the tines is to be effected.

It should now be apparent that there has been provided by this invention a tool generally of the shape of a garden rake in which the several tines depending from its crossbar can be individually adjusted so that the rake tool can be converted into a cultivating tool for use in cultivating between closely spaced vegetable rows and upon opposite sides of each row at the same time by a single dragging rake-like pass of the cultivating tool along the vegetable rows, instead of by chopping action as with an ordinary bladed cultivating how, thereby permitting the vegetable or flower rows to be planted closer together than heretofore.

While various changes may be made in the detail construction, it shall be understood that such changes shall be within the spirit and scope of the present invention as defined by the appended claims.

We claim:

1. A convertible garden rake and cultivating tool comprising a crossbar being substantially the width of an ordinary garden rake, pull handle means extending rearwardly from the crossbar and tines laterally spaced from one another and vertically-adjustable through the crossbar to either even depth positions for the normal use of the tool as a rake with the upper ends of the tines passing upwardly through the top face of the crossbar or to an even lower depth position of certain of the tines while alternate tines may be raised above their ordinary raking positions to accommodate growing vegetable or flower rows and provide a cultivating tool that will, when used like a rake by a single pass along closely-spaced rows, cultivate the same on opposite sides of one or more rows at the same time, said tines being substantially longer than tines of an ordinary garden rake and threaded throughout substantially their entire length, said crossbar having free openings spaced from one another and corresponding in number to the number of tines of the tool when used as a rake, an internally-threaded elongated sleeve in each of the free openings and secured to the crossbar against rotation therein, said threaded tines being respectively threaded in the respective sleeves for vertical adjustment with respect to the crossbar and throughout substantially their full length between raking and cultivating positions, each sleeve being flanged and extended flush against the top face of the crossbar, said crossbar on its top face and about the sleeve flange having a scale of circumferentially-spaced radially-extending indicia lines, and each of said threaded tines having an enlarged head by which the threaded tine is manually adjusted in the sleeve and with respect to the crossbar, and said tine head having an indicator line thereon adapted to traverse the scale lines of the crossbar assembly so that the depth of adjustment or setting of the tine may be so readily determined therefrom.

2. A convertible garden rake and cultivating tool as defined in claim 1 and the lower end of each threaded tine being pointed to penetrate the garden dirt and said tine head being vertically-rounded with a lateral hole extending through the head portion to facilitate the vertical adjustment of the individual tine through the vertically-threaded opening of the crossbar sleeves.

* * * * *